(12) United States Patent
Ishigo et al.

(10) Patent No.: US 8,876,391 B2
(45) Date of Patent: Nov. 4, 2014

(54) MAIN BEARING FOR CRANKSHAFT OF INTERNAL COMBUSTION ENGINE

(71) Applicant: Daido Metal Company Ltd., Nagoya (JP)

(72) Inventors: Osamu Ishigo, Inuyama (JP); Yuichi Tomita, Inuyama (JP); Motohira Yamada, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 34 days.

(21) Appl. No.: 13/706,774

(22) Filed: Dec. 6, 2012

(65) Prior Publication Data

US 2013/0156358 A1  Jun. 20, 2013

(30) Foreign Application Priority Data

Dec. 16, 2011  (JP) ................. 2011-275833

(51) Int. Cl.
*F16C 33/10* (2006.01)
*F16C 9/02* (2006.01)
*F02B 77/00* (2006.01)
*F16C 17/02* (2006.01)

(52) U.S. Cl.
CPC .............. *F02B 77/00* (2013.01); *F16C 2360/22* (2013.01); *F16C 9/02* (2013.01); *F16C 33/1065* (2013.01); *F16C 17/022* (2013.01); *F16C 33/1045* (2013.01)
USPC .............................. 384/288; 384/291; 384/294

(58) Field of Classification Search
CPC .......... F16C 9/02; F16C 17/02; F16C 17/022; F16C 33/10; F16C 33/102; F16C 33/1025; F16C 33/1045; F16C 33/1055; F16C 33/1065; F16C 33/046; F16C 2360/22
USPC ......... 384/275, 276, 280–283, 286, 288, 289, 384/291, 294, 322
See application file for complete search history.

(56) References Cited

U.S. PATENT DOCUMENTS

| 7,954,600 B2 * | 6/2011 | Ohta ........................ 123/196 R |
| 2009/0257695 A1 | 10/2009 | Ukai et al. |

(Continued)

FOREIGN PATENT DOCUMENTS

| EP | 1 510 709 | 3/2005 |
| EP | 2 078 875 | 7/2009 |

(Continued)

OTHER PUBLICATIONS

Extended European Search Report issued Mar. 22, 2013 in corresponding European patent application Serial No. 12196480.3-1758 (seven pages).

(Continued)

*Primary Examiner* — James Pilkington
(74) *Attorney, Agent, or Firm* — Harness, Dickey & Pierce, P.L.C.

(57) ABSTRACT

A main bearing for a crankshaft of an internal combustion engine comprises a pair of semi-cylindrical bearings. An oil groove extends on an inner circumferential surface of one semi-cylindrical bearing in a circumferential direction so that the center thereof in an axial direction aligns with that of an inlet opening of a lubricating oil path in a journal section of the crankshaft. The oil groove does not extend up to an axial direction groove formed at a joint portion of the semi-cylindrical bearings so that a separation inner circumferential surface extends between a circumferential direction end portion of the oil groove and the axial direction groove. The length of the separation inner circumferential surface is smaller than that of the inlet opening in the circumferential direction.

12 Claims, 9 Drawing Sheets

(56) References Cited

U.S. PATENT DOCUMENTS

| | | |
|---|---|---|
| 2010/0316312 A1 | 12/2010 | Maitani et al. |
| 2011/0058761 A1 | 3/2011 | Ishigo et al. |
| 2011/0058762 A1 | 3/2011 | Ishigo et al. |
| 2012/0148179 A1* | 6/2012 | Kondo et al. ............ 384/286 |
| 2012/0201485 A1* | 8/2012 | Kondo et al. ............ 384/276 |
| 2012/0304957 A1* | 12/2012 | Watanabe ............ 123/196 R |

FOREIGN PATENT DOCUMENTS

| | | |
|---|---|---|
| JP | 61-000573 | 1/1986 |
| JP | 04-219521 | 8/1992 |
| JP | 2005-069284 | 3/2005 |
| JP | 2005-249024 | 9/2005 |
| JP | 2008-095858 | 4/2008 |
| JP | 2011-085260 | 4/2011 |
| JP | 2011-179572 | 9/2011 |
| WO | WO 2011/104940 | 9/2011 |

OTHER PUBLICATIONS

Office Action issued Oct. 18, 2013 in corresponding Japanese patent application Serial No. 2011-275833 (two pages).

* cited by examiner

MAIN BEARING FOR CRANKSHAFT OF INTERNAL COMBUSTION ENGINE

BACKGROUND OF THE INVENTION (1) Field of the Invention

The present invention relates to a main bearing for a crankshaft of an internal combustion engine, and more particularly relates to a main bearing for supporting a journal section of a crankshaft in a cylinder block lower portion of an internal combustion engine. Further, the present invention also relates to a bearing apparatus constituted by such a main bearing and a corresponding shaft section.

(2) Description of Related Art

A crankshaft of an internal combustion engine is supported at a journal section thereof in a cylinder block lower portion of the internal combustion engine via a main bearing formed of a pair of semi-cylindrical bearings. In order to lubricate the main bearing, lubricating oil which is discharged by an oil pump is fed into a lubricating oil groove which is formed along an inner circumferential surface of the main bearing, through an oil gallery which is formed in a wall of the cylinder block and a through port which is formed in a wall of the main bearing. In the crankshaft, a first lubricating oil path is formed by being penetrated in a diameter direction through the journal section, and communicates with the lubricating oil groove of the main bearing at both end openings of the first lubricating oil path. Furthermore, a second lubricating oil path is formed to branch from the first lubricating oil path and pass a crank arm section, and communicates with a third lubricating oil path which is formed by being penetrated in a diameter direction of a crankpin. Accordingly, the lubricating oil which is fed into the lubricating oil groove of the main bearing passes through the first lubricating oil path, the second lubricating oil path and the third lubricating oil path, and thereafter, is supplied to a slide surface between the crankpin and a connecting rod bearing from an end portion opening (lubricating oil outlet which is formed on an outer circumferential surface of the crankpin) of the third lubricating oil path.

Figure 1:
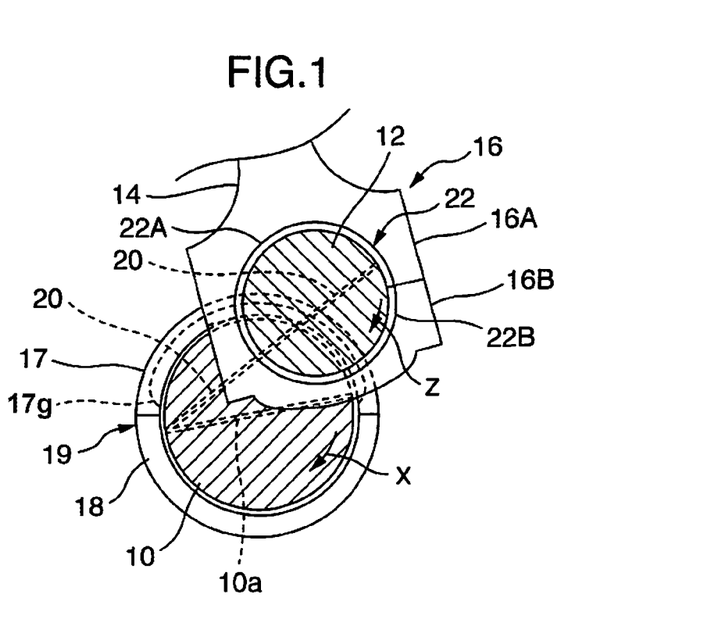
FIG. 1 is a schematic view of a crankshaft of an internal combustion engine cut at a journal section and a crank pin section respectively.

The lubricating oil groove of the main bearing is formed on at least one of inner circumferential surfaces of a pair of semi-cylindrical bearings throughout an entire length in a circumferential direction thereof (FIG. 1 of Japanese Utility Model Publication No. 61-00573). In this case, the lubricating oil which is supplied to the lubricating oil groove of the main bearing from the oil gallery in the cylinder block mainly flows to the end portion in the circumferential direction of the semi-cylindrical bearing with rotation of the journal section, and most of the lubricating oil is discharged to an outside of the bearing through the axial direction groove formed in the joint portion of the pair of semi-cylindrical bearings.

Furthermore, in recent years, in response to miniaturization of the lubricating oil supplying oil pump with the objective of enhancing fuel efficiency of an internal combustion engine, there is also used a main bearing in which the length in the circumferential direction of the lubricating oil groove is configured to be shorter than the entire length in the circumferential direction of the semi-cylindrical bearing, and therefore, at least one of both end portions in the circumferential direction of the lubricating oil groove does not extend to the end portion in the circumferential direction of the semi-cylindrical bearing (namely, does not open at the axial direction groove), in order to reduce the leakage amount of the lubricating oil from the end portion in the circumferential direction of the semi-cylindrical bearing (see JP-Y2-61-000573, JP-A-04-219521, JP-A-2005-249024, JP-A-2011-179572 and JP-A-2008-095858).

BRIEF SUMMARY OF THE INVENTION

The lubricating oil which is fed to the connecting rod bearing from the oil gallery in the cylinder block via the main bearing and the internal lubricating oil paths of the crankshaft is likely to be accompanied by residual foreign matters that are generated at the time of machining of the respective components, for example. There is the fear that the foreign matters damage a slide surface between the journal section and the main bearing and a slide surface between the crankpin and the connecting rod bearing, and therefore need to be quickly discharged to the outside from the flow of the lubricating oil.

In the conventional main bearing in which the lubricating oil groove is formed in the inner circumferential surface throughout the entire length in the circumferential direction of the semi-cylindrical bearing, the lubricating oil which is supplied to the lubricating oil groove of the main bearing from the oil gallery in the cylinder block can flow to the end portion in the circumferential direction of the semi-cylindrical bearing, and therefore, the foreign matters accompanying the lubricating oil can be discharged to the outside of the bearing through the gap which is formed by the axial direction groove of the main bearing and the journal section. However, in the case of the main bearing which is configured so that at least one of both the end portions in the circumferential direction of the lubricating oil groove does not reach the axial direction groove in order to reduce the leakage amount of the lubricating oil from the axial direction groove in response to miniaturization of the lubricating oil supplying oil pump as described above, not only the lubricating oil but also foreign matters are difficult to be discharged from the lubricating oil groove of the main bearing, and tend to stay in the vicinity of the end portions in the circumferential direction of the lubricating oil groove.

The foreign matters which stay in the vicinity of the end portions in the circumferential direction of the lubricating oil groove become the cause of inducing a damage to the slide surface between the journal section and the main bearing. Further, the foreign matters enter the lubricating oil path in the inside of the crankshaft when the inlet opening of the first lubricating oil path formed on the outer circumferential surface of the journal section rotates to pass the vicinity of the end portion of the lubricating oil groove, and then is fed to the slide surface between the crank pin and the connecting rod bearing, where the foreign matters also become the cause of inducing a damage. As a result, the main bearing which is configured so that at least one of both the end portions in the circumferential direction of the lubricating oil groove does not reach the axial direction groove reduces the life of not only the main bearing itself but also the connecting rod bearing.

Accordingly, an object of the present invention is to provide a main bearing that has an excellent foreign matter discharging function while reducing an oil leakage amount, that is, a main bearing that can prevent a large amount of foreign matters from staying at an end portion in a circumferential direction of a lubricating oil groove while restraining outflow of lubricating oil to an axial direction groove from the end portion in the circumferential direction of the lubricating oil groove which is formed in a bearing inner circumferential surface. Another object of the present invention is to provide a bearing apparatus constituted by such a main bearing and a journal section.

In order to attain the above-described objects, according to a first aspect of the present invention, a main bearing for a crankshaft of an internal combustion engine as follows is provided.

A main bearing for a crankshaft of an internal combustion engine for rotatably supporting a journal section of a crankshaft, the journal section having a lubricating oil path extending therein, and an inlet opening of the lubricating oil path formed on an outer circumferential surface thereof, wherein the main bearing is constituted by a pair of semi-cylindrical bearings, and an oil groove is formed on an inner circumferential surface of any one of the semi-cylindrical bearings, the oil groove extends in a circumferential direction at least through a central portion in the circumferential direction of the one semi-cylindrical bearing, and is disposed so that the center of the width of the oil groove in an axial direction aligns with the center of the inlet opening of the journal section, while an end portion in the circumferential direction of the oil groove does not extend up to an end surface in the circumferential direction of the one semi-cylindrical bearing, and therefore, the inner circumferential surface also extends between the end portion in the circumferential direction of the oil groove and the end surface in the circumferential direction of the one semi-cylindrical bearing to provide a separation inner circumferential surface therebetween, the end surface in the circumferential direction to which the oil groove of the one semi-cylindrical bearing does not extend, and the end surface in the circumferential direction of the other semi-cylindrical bearing joined thereto are each provided with inclined surfaces, which extend on an inner circumferential surface side throughout the entire length of the semi-cylindrical bearing in the axial direction, whereby an axial direction groove is formed at a joint portion of the pair of semi-cylindrical bearings, and the separation inner circumferential surface extends between the axial direction groove and the oil groove, and a length L1 in the circumferential direction of the separation inner circumferential surface is smaller than a length L2 in the circumferential direction of the inlet opening of the journal section, and therefore, the oil groove is communicable with the axial direction groove via the inlet opening of the lubricating oil path.

In one embodiment of the present invention, the length L1 in the circumferential direction of the separation inner circumferential surface, and the length L2 in the circumferential direction of the inlet opening of the journal section satisfy a relational expression as follows:

$$L2-L1 \geq 0.5 \text{ mm}.$$

In another embodiment of the present invention, the length L1 in the circumferential direction of the separation inner circumferential surface, and the length L2 in the circumferential direction of the inlet opening of the journal section satisfy a relational expression as follows:

$$L1 \geq L2 \times 0.3.$$

More preferably, the length L1 in the circumferential direction of the separation inner circumferential surface, and the length L2 in the circumferential direction of the inlet opening of the journal section satisfy a relational expression as follows:

$$L1 \geq L2 \times 0.6.$$

In still another embodiment of the present invention, a depth of the axial direction groove from the inner circumferential surface of the main bearing is 0.1 mm to 1 mm.

More preferably, the depth of the axial direction groove from the inner circumferential surface of the main bearing is 0.1 mm to 0.5 mm.

In still another embodiment of the present invention, a width in the circumferential direction of the axial direction oil groove on the inner circumferential surface of the main bearing is 0.2 mm to 2 mm.

In yet another embodiment of the present invention, both end portions in the circumferential direction of the oil groove do not extend up to the respective end surfaces in the circumferential direction of the one semi-cylindrical bearing, and therefore, the separation inner circumferential surfaces are formed on both sides in the circumferential direction of the oil groove.

In still another embodiment of the present invention, a crush relief is formed on an inner circumferential surface side of the pair of semi-cylindrical bearings adjacent to each of the end surfaces in the circumferential direction of the pair of semi-cylindrical bearings.

Preferably, an end portion of the crush relief on a central side in the circumferential direction of the one semi-cylindrical bearing is located on an end surface side in the circumferential direction from the end portion in the circumferential direction of the oil groove.

In yet another embodiment of the present invention, the area of the inlet opening on an outer circumferential surface of the journal section is larger than the sectional area of the lubricating oil path in the journal section, and therefore, a channel transition portion the sectional area of which gradually changes is formed between the inlet opening and the lubricating oil path.

Preferably, a depth dimension of the channel transition portion from an outer circumferential surface of the journal section is 1 mm to 2 mm.

According to a second aspect of the present invention, a bearing apparatus constituted by the crankshaft main bearing according to the first aspect described above, and the journal section which is supported by the main bearing is provided.

By adopting the configuration of the present invention, the lubricating oil which is supplied into the lubricating oil groove through the through port formed in the wall of the main bearing is restrained from flowing out from the axial direction groove of the main bearing by the separation inner circumferential surface which extends between the end portion in the circumferential direction of the oil groove and the axial direction groove, while the foreign matters accompanying the lubricating oil can be properly discharged from the axial direction groove of the main bearing by the oil groove and the axial direction groove communicating with each other when the inlet opening of the journal section passes on the separation inner circumferential surface.

Other objects, features and advantages of the present invention will become apparent from the following description of the embodiments of the present invention concerning the accompanying drawing.

DETAILED DESCRIPTION OF THE INVENTION

[Embodiment 1]

Hereinafter, embodiments of the present invention will be described with reference to the accompanying drawings.

FIG. 1 is a schematic view of a crankshaft of an internal combustion engine cut at a journal section and a crankpin section respectively, and shows a journal section 10, a crankpin 12 and a connecting rod 14. As a positional relation of the three members in a paper surface depth direction, the journal section 10 is on a rear side of the paper surface, the crankpin 12 is on a front side, and the crankpin 12 is enveloped by a large end portion housing 16 of the connecting rod 14 which carries a piston at the other end.

The journal section 10 is supported in a cylinder block lower portion (not illustrated) of the internal combustion engine via a main bearing 19 which is constituted by a pair of semi-cylindrical bearings 17 and 18. An oil groove 17g which extends in a circumferential direction except for regions near both ends of the main bearing is formed on an inner circumferential surface only in the semi-cylindrical bearing 17 which is located on an upper side in the drawing. The journal section 10 has a through-hole (lubricating oil path) 10a in a diameter direction thereof, and when the journal section 10 rotates in an arrow X direction, inlet openings at both ends of the through-hole 10a alternately communicate with the oil groove 17g. It should be noted that if the oil groove is formed in both the semi-cylindrical bearings 17 and 18 on the upper side and a lower side, the leakage amount of the lubricating oil from the main bearing 19 increases, and therefore, in the present invention, the oil groove needs to be formed only in any one of the semi-cylindrical bearings on the upper side and the lower side.

A lubricating oil path 20 which penetrates through the journal section 10, a crank arm not illustrated and the crankpin 12 to communicate with the through-hole 10a is formed in the inside of the crankshaft.

The crankpin 12 is held by the large end portion housing 16 (constituted by a connecting rod side large end portion housing 16A and a cap side large end portion housing 16B) of the connecting rod 14 via a connecting rod bearing 22 which is constituted by a pair of semi-cylindrical bearings 22a and 22b.

FIGS. 2 to 7 show the details of a pair of semi-cylindrical bearings 17 and 18 which constitute the main bearing 19. The semi-cylindrical bearing 17 on the upper side of the paper surface has a front side circumferential direction end surface 17A which is disposed on a front side in the rotational direction X of the journal section 10, and a rear side circumferential direction end surface 17B which is disposed on a rear side. The semi-cylindrical bearing 18 on the lower side has a front side circumferential direction end surface 18B which is disposed on the front side in the rotational direction X of the journal section 10, and a rear side circumferential direction end surface 18A which is disposed on the rear side. The front side circumferential direction end surface 17A of the semi-cylindrical bearing 17 abuts on the rear side circumferential direction end surface 18A of the semi-cylindrical bearing 18, and the front side circumferential direction end surface 18B of the semi-cylindrical bearing 18 abuts on the rear side circumferential direction end surface 17B of the semi-cylindrical bearing 17, whereby the main bearing 19 of a cylindrical shape is configured.

The front side circumferential direction end surface 17A and the rear side circumferential direction end surface 17B of the semi-cylindrical bearing 17 respectively have inclined surfaces 17C and 17D which are formed in a chamfering manner throughout an entire length in the axial direction on inner circumferential surface sides, and the front side circumferential direction end surface 18B and the rear side circumferential direction end surface 18A of the semi-cylindrical bearing 18 respectively have inclined surfaces 18D and 18C which are similarly formed throughout an entire length in the axial direction on inner circumferential sides, whereby axial direction grooves 24A and 24B are formed at joint portions of the semi-cylindrical bearings 17 and 18.

Figure 2:
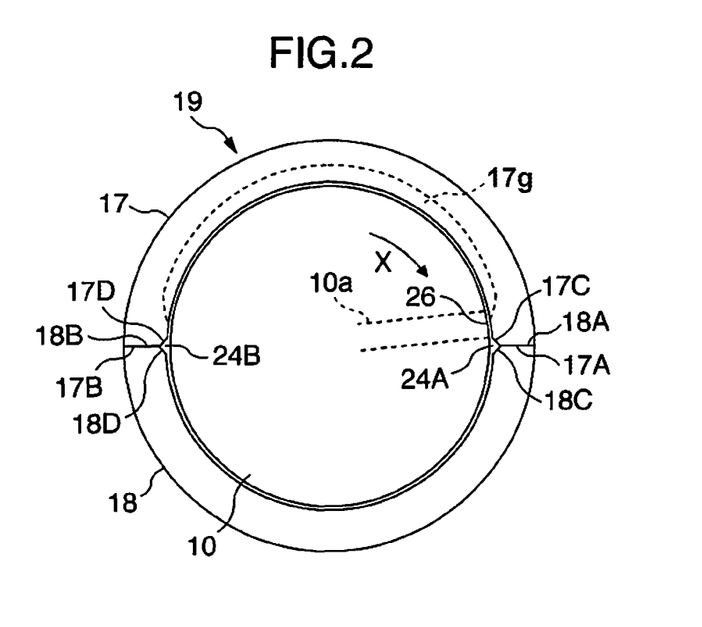
FIG. 2 is a front view of a crankshaft main bearing and the crank shaft according to embodiment 1 of the present invention.
Figure 3:
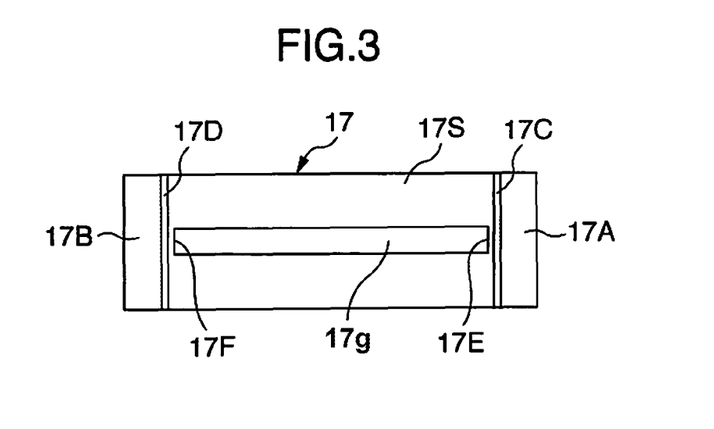
FIG. 3 is a plan view of a semi-cylindrical bearing on an upper side of the main bearing shown in FIG. 2, seen from a bearing inner circumferential surface side.
Figure 4:
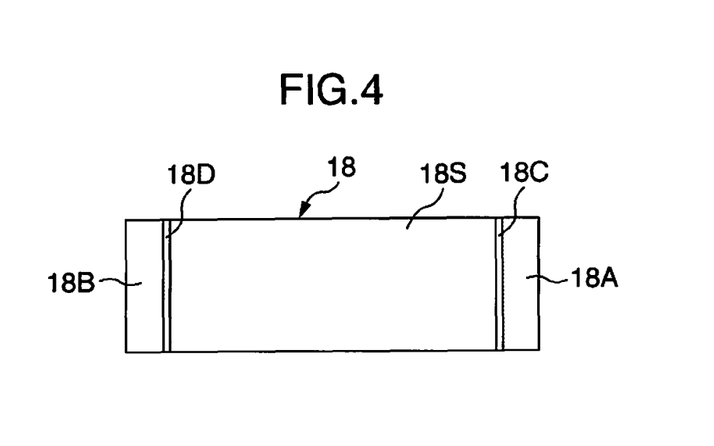
FIG. 4 is a plan view of a semi-cylindrical bearing on a lower side of the main bearing shown in FIG. 2, seen from the bearing inner circumferential surface side.
Figure 5:
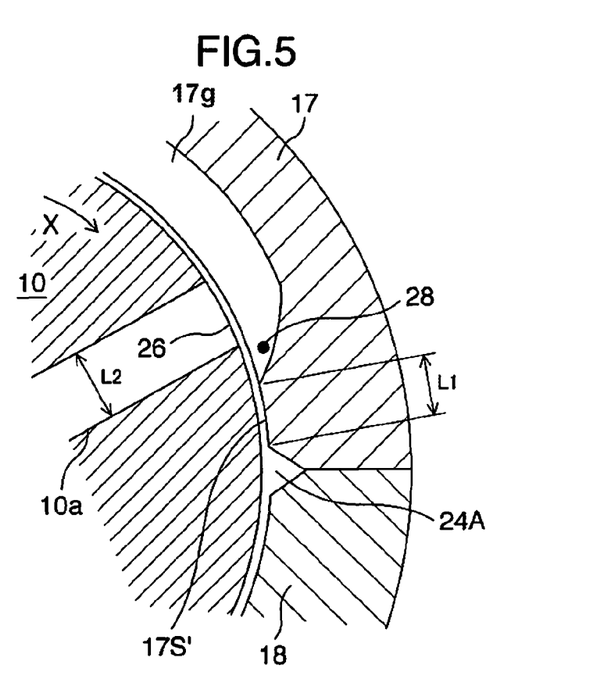
FIG. 5 is an enlarged sectional view of a joint portion of the main bearing and the crankshaft shown in FIG. 2, seen from an axial direction.
Figure 6:
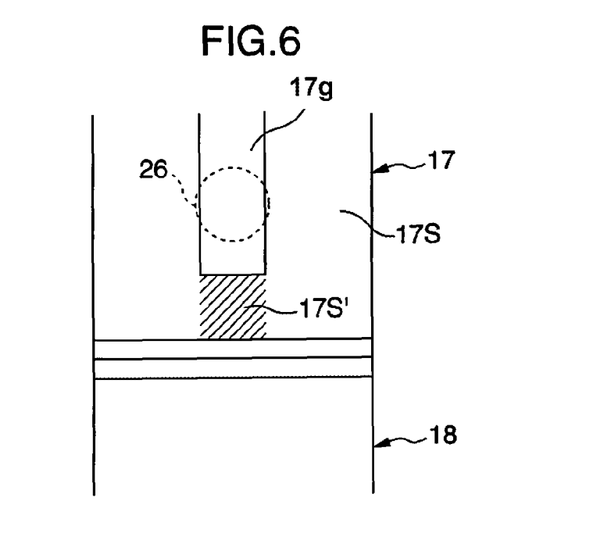
FIG. 6 is a view of the joint portion of the main bearing shown in FIG. 2 seen from a bearing inner circumferential surface side.

As is understood from FIG. 2, the oil groove 17g which is formed on an inner circumferential surface 17S of the semi-cylindrical bearing 17 has a constant depth in a region including a central portion in the circumferential direction, and the depth thereof gradually decreases toward the end portions in the regions near the end portions in the circumferential direction. Both end portions 17E and 17F in the circumferential direction of the oil groove 17g do not extend to the inclined surface 17C and the inclined surface 17D respectively, and therefore, the inner circumferential surface 17S extends between the end portion 17E and the inclined surface 17C, and between the end portion 17F and the inclined surface 17D (FIGS. 3 and 5). In the present description, a portion corresponding to the inner circumferential surface 17S which extends over a circumferential direction length (linear distance) L1 so as to separate the circumferential direction end portion 17E of the oil groove 17g and the inclined surface 17C will be called a separation inner circumferential portion 17S' (diagonally shaded portion of FIG. 6) hereinafter.

As is understood from FIG. 3, the oil groove 17g is disposed at a center of the width in the axial direction of the semi-cylindrical bearing 17. A through port (not illustrated) which is penetrated through the semi-cylindrical bearing 17 in a radial direction is formed in a bottom portion of the oil groove 17g, and the lubricating oil is supplied into the oil groove 17g through the through port from the oil gallery in the wall of the cylinder block. A part of the lubricating oil flows forward in the rotational direction in the oil groove 17a with rotation in the arrow X direction of the journal section 10, and the other part of the lubricating oil flows in an opposite direction from the rotational direction in the oil groove 17g. The semi-cylindrical bearing 17 is also disposed so that the center in the width direction of the oil groove 17g aligns with the center of an inlet opening 26 of the lubricating oil path 10a of the journal section 10 (in FIG. 6, the inlet opening 26 in the rotational position of FIG. 5 is shown by the broken line), and therefore the lubricating oil supplied into the oil groove 17g can further flow to the connecting rod bearing 22 through the inlet opening 26. The size of the inlet opening 26 of the lubricating oil path 10a in the journal section 10 differs depending on the specifications of the internal combustion engine, and, for example, in the case of a compact internal combustion engine for a passenger car, the size is about 5 to 8 mm in diameter.

Figure 8:
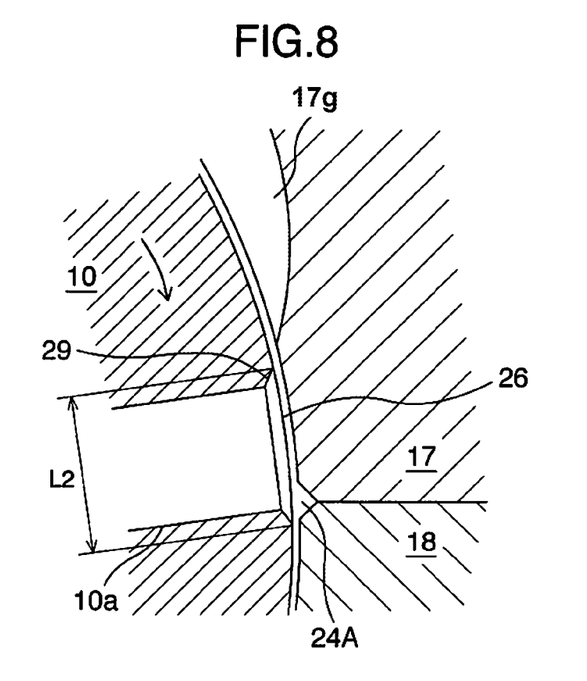
FIG. 8 is an enlarged sectional view of another example of the joint portion of the main bearing and the crankshaft shown in FIG. 2, seen from the axial direction.

The inlet opening 26 is described as having the same sectional area as the lubricating oil path 10a in FIG. 5. However, the inlet opening 26 may have a sectional area larger than the lubricating oil path 10a as shown in FIG. 8 as the result of machining, and may have a circular or elliptical opening shape on the outer circumferential surface of the journal section 10. When the sectional area of the inlet opening 26 is larger than the sectional area of the lubricating oil path 10a, a channel transition portion 29 the sectional area of which gradually changes is formed to a depth of 1 to 2 mm between the inlet opening 26 and the lubricating oil path 10a. In any case, the inlet opening 26 has a circumferential direction length (linear distance) L2 on the outer circumferential surface of the journal section 10.

Figure 9:
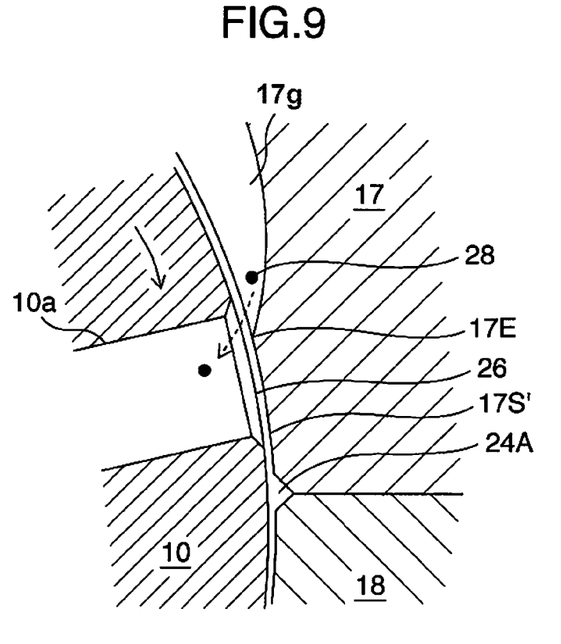
FIG. 9 is an enlarged sectional view of one joint portion seen from the axial direction for explaining a function of the main bearing shown in FIG. 2.
Figure 10:
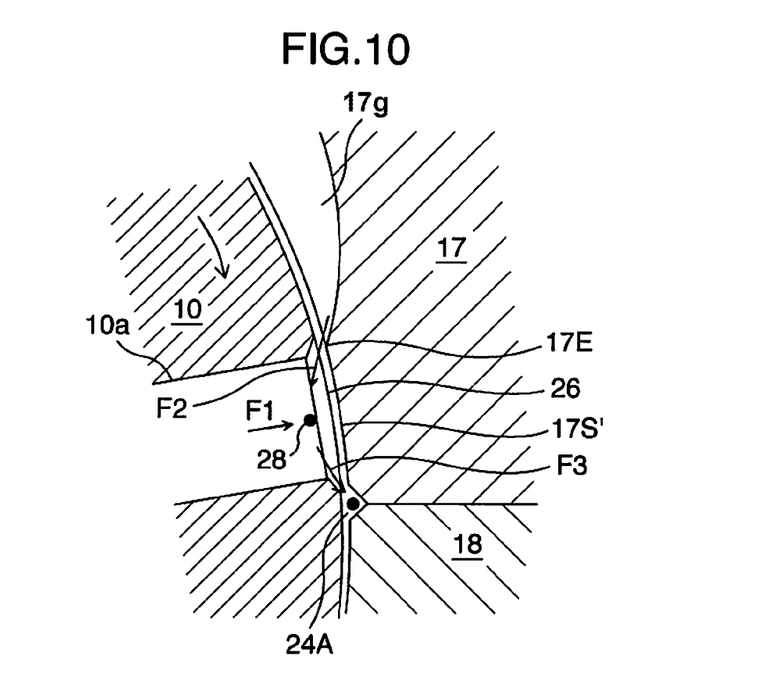
FIG. 10 is an enlarged sectional view of one joint portion seen from the axial direction for explaining the function of the main bearing shown in FIG. 2.

When a foreign matter 28 is included in the lubricating oil which is supplied to the oil groove 17g, the foreign matter 28 moves to any one of both the end portions in the circumferential direction of the oil groove 17g due to a specific gravity difference between the foreign matter 28 and the lubricating oil (FIG. 5). In a conventional crankshaft main bearing, the foreign matter stays in the end portion in the circumferential direction of the oil groove, and becomes the cause of inducing damage to the slide surface between the journal section and the main bearing, or the foreign matter flows into the lubricating oil path together with the lubricating oil when the inlet opening of the journal section passes above the end portion in the circumferential direction of the oil groove, and becomes the cause of inducing damage to the slide surface between the crankpin and the connecting rod bearing. However, according to the embodiment of the present invention, a length L1 in the circumferential direction of the separation inner circumferential portion 17S' is formed to be smaller than the length L2 in the circumferential direction of the inlet opening 26, and therefore, the foreign matter 28 which enters the lubricating oil path 10a when the inlet opening 26 passes above the end portion 17E of the oil groove 17g with rotation of the journal section 10 (see FIG. 9) is discharged to an axial direction groove 24A when the inlet opening 26 is located on the separation inner circumferential surface 17S', and thereby the oil groove 17g communicates with the axial direction groove 24A via the inlet opening 26 (see FIG. 10).

Figure 11:
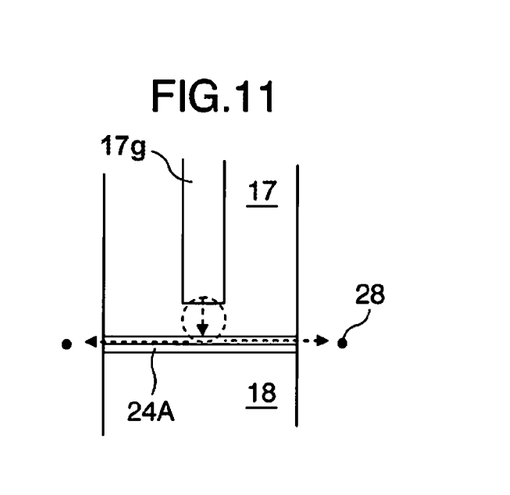
FIG. 11 is a view of one joint portion seen from the bearing inner circumferential surface side for explaining the function of the main bearing shown in FIG. 2.

In more detail, when the oil groove 17g communicates with the axial direction groove 24A via the inlet opening 26, (1) centrifugal force F1 by rotation of the journal section 10, (2) flow F2 by the pressure gradient of the lubricating oil in the oil groove 17g and the lubricating oil path 10a, and (3) flow F3 by the pressure gradient of the lubricating oil in the lubricating oil path 10a and the axial direction groove 24A simultaneously act on the foreign matter 28 and the lubricating oil inside the lubricating oil path 10a in the vicinity of the inlet opening 26, and the flow of the lubricating oil sufficient to move the foreign matter 28 which enters the lubricating oil path 10a to the axial direction groove 24A is instantly formed. Further, at this instant, the flow to the axial direction of the main bearing 19 is also formed in the axial direction groove 24A, and helps the foreign matter 28 to be discharged to the outside of the bearing (FIG. 11).

Thereafter, with rotation of the journal section 10, communication between the oil groove 17g and the axial direction groove 24A is shut off (see FIG. 8, for example), and the flow in the axial direction in the axial direction groove 24A also decreases. Therefore, outflow of the lubricating oil from the main bearing 19 is restrained.

Figure 12:
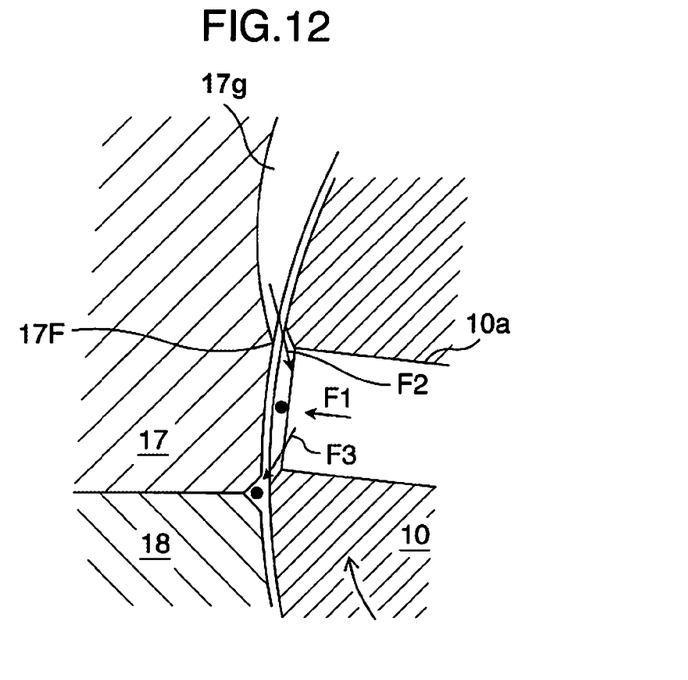
FIG. 12 is an enlarged sectional view of the other joint portion seen from the axial direction for explaining the function of the main bearing shown in FIG. 2.

Further, according to the present invention, at the instant when the oil groove 17g and an axial direction groove 24B communicate with each other via the inlet opening 26 at the rotational direction rear side end portion 17F of the oil groove 17g, the actions F1 to 3 described above also work as shown in FIG. 12, and therefore, the foreign matter can be discharged while the leakage amount of the lubricating oil is reduced.

According to the present invention, the circumferential direction length L1 of the separation inner circumferential portion 17S' is required to be smaller than the circumferential direction length L2 of the inlet opening 26. This is because in the case of L1≥L2, the inlet opening 26 does not communicate with the oil groove 17g any more when the inlet opening 26 starts to communicate with the axial direction groove 24A, therefore, the flow F2 from the oil groove 17g shown in FIG. 10 does not occur, and therefore, the foreign matter 28 which enters the lubricating oil path 10a cannot be forcefully passed to the axial direction groove 24A.

For the flow of the lubricating oil sufficient to force out the foreign matter 28 which enters the lubricating oil path 10a to the axial direction groove 24A, the circumferential length L1 of the separation inner circumferential portion 17S' and the circumferential length L2 of the inlet opening 26 preferably satisfy the relation of L2−L1≥0.5 mm. In order to prevent the lubricant oil from excessively flowing out when the oil groove 17g communicates with the axial direction groove 24A, the circumferential direction length L1 of the separation inner circumferential portion 17S' and the circumferential direction length L2 of the inlet opening 26 preferably satisfy the relation of L1≥L2×0.3, and more preferably satisfy the relation of L1≥L2×0.6. This is because if the circumferential length L1 of the separation inner circumferential portion 17S' is too short, a time in which the oil groove 17g and the axial direction groove 24A communicate with each other becomes long, the amount of the oil which flows into the axial direction groove 24A from the end portion 17E of the oil groove 17g, that is, a leakage amount increases, and therefore, the amount of the oil which is fed to the connecting rod bearing 22 decreases.

Figure 7:
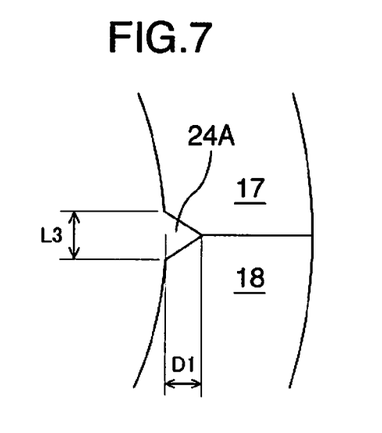
FIG. 7 is an enlarged front view of the joint portion of the main bearing shown in FIG. 2.

A circumferential direction length (linear distance) L3 of the axial direction groove 24A on the inner circumferential surface of the main bearing 19 can be set at 0.2 to 2 mm, a maximum depth D1 of the axial direction groove 24A from the inner circumferential surface of the main bearing 19 can be set at 0.1 to 1 mm, preferably 0.1 to 0.5 mm (FIG. 7). The circumferential length L3 and the depth D1 of the axial direction groove 24A may be the minimum dimensions by which the foreign matter can be discharged, in the light of the sizes of the foreign matters included in the lubricating oil (in general, about 0.1 mm at the maximum).

When the sectional area of the inlet opening 26 is larger than the sectional area of the lubricating oil path 10a as described above, and the channel transition portions 29 are formed at least both sides in the circumferential direction of the inlet opening 26, the lubricating oil in the oil groove 17g is guided by the inclined surface of the channel transition portion 29 and easily flows into the lubricating oil path 10a when the oil groove 17g and the axial direction groove 24A communicate with each other, and therefore, the flow F2 (FIG. 10) in the circumferential direction which forcefully passes the foreign matter 28 toward the axial direction groove 24A can be made strong. Further, the inclined surface on the front side in the rotational direction of the inlet opening 26 helps the foreign matter 28 enter the axial direction groove 24A.

Figure 13:
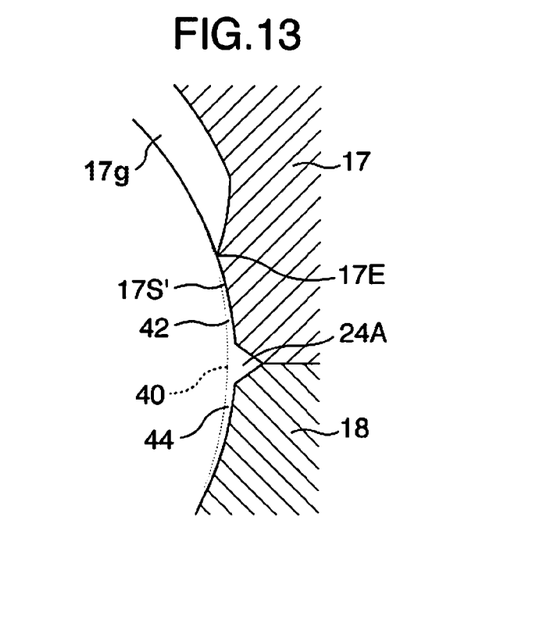
FIG. 13 is an enlarged sectional view of the joint portion of the main bearing shown in FIG. 2 in the case of being provided with crush reliefs, seen from the axial direction.
Figure 14:
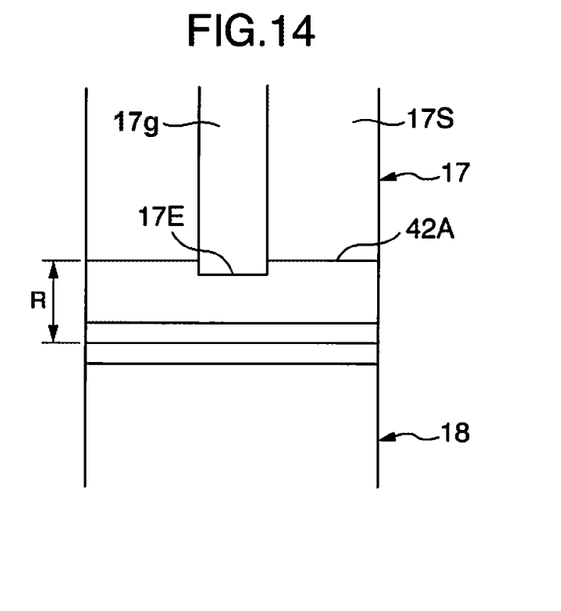
FIG. 14 is a view of the joint portion of the main bearing shown in FIG. 13 seen from the bearing inner circumferential surface side.

The crankshaft main bearing 19 according to the present invention may have crush reliefs 42 and 44 on the bearing inner circumferential surfaces adjacent to the joint portion of the semi-cylindrical bearings 17 and 18. The crush reliefs are release spaces 42 and 44 which are formed by decreasing a thickness of a wall portion in the circumferential direction end portion region of each of the semi-cylindrical bearings 17 and 18 in the radial direction from an original inner circumferential surface 40 (main circular arc) which is concentric with a center of rotation as shown in FIGS. 13 and 14, and the crush reliefs are formed to absorb a positional displacement and deformation of the circumferential direction end surfaces of the semi-cylindrical bearing which can occur when, for example, a pair of the semi-cylindrical bearings 17 and 18 are assembled to the journal section 10 of the crankshaft. Accordingly, a curvature center position of the bearing inner circumferential surface 17S in the region R where the crush relief 42 is formed differs from a curvature center position of the bearing inner circumferential surface (main circular arc) in the other region (see SAE J506 (item 3.26 and item 6.4), DIN1497, section 3.2, JIS D3102). In general, in the case of a compact internal combustion engine bearing for a passenger car, a depth (distance from the original inner circumferential surface to the actual inner circumferential surface) of the crush relief in the circumferential direction end surface of the split bearing is about 0.01 to 0.05 mm.

Figure 15:
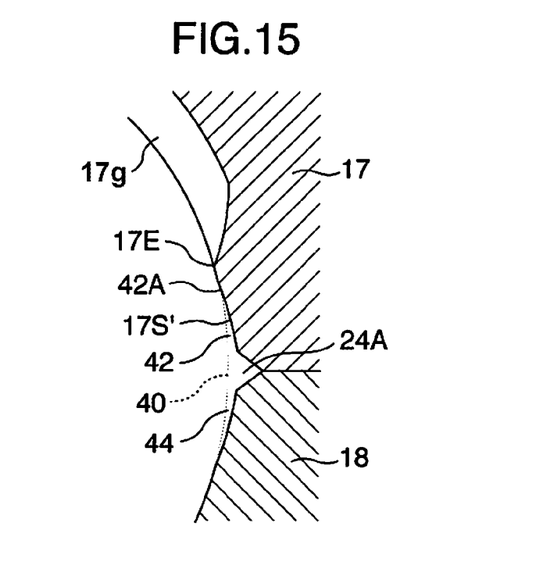
FIG. 15 is an enlarged sectional view of the joint portion of the main bearing shown in FIG. 2 in the case of being provided with crush reliefs different from FIG. 13, seen from the axial direction.

In the crush relief 42, the depth is gradually decreased toward a central side in the circumferential direction of the semi-cylindrical bearing 17, and an end portion 42A which defines a region where the crush relief 42 is formed on the bearing inner circumferential surface 17S. The end portion 42A may be located on a central side in the circumferential direction from the circumferential direction end portion 17E of the oil groove 17g as shown in FIGS. 13 and 14, or may be located on an end portion side in the circumferential direction from the circumferential direction end portion 17E of the oil groove 17g as shown in FIG. 15. This is because the depth of the crush relief 42 is sufficiently small as compared with the depths of the oil groove 17g and the axial direction groove 24A, and therefore, the difference between the original inner circumferential surface 40 and the actual inner circumferential surface 17S' does not influence the discharge action of a foreign matter. However, when the circumferential direction end portion 42A of the crush relief 42 is located on the central side in the circumferential direction from the position of the circumferential direction end portion 17E of the oil groove 17g, a gap which is formed between the separation inner circumferential portion 17S' and the outer circumferential surface of the journal section 10 slightly increases, and therefore, the amount of oil which flows to the axial direction groove 24A from the oil groove 17g, that is, the amount of leakage from the main bearing 19 slightly increases. Accordingly, from the viewpoint of reducing the leakage amount of the lubricating oil, the end portion 42A of the crush relief 42 is preferably located on the end portion side in the circumferential direction from the circumferential direction end portion 17E of the oil groove 17g as shown in FIG. 15.

In other words, in the case of the semi-cylindrical bearing 17 in which the crush relief 42 shown in FIG. 15 is formed, even if the inlet opening 26 of the journal section 10 has the circumferential direction length L2 that allows the oil groove 17g to communicate with only the region R in which the crush relief 42 is formed, a foreign matter is not discharged, but stays at the end portion of the oil groove 17g. This is because in the initial stage at which the inlet opening 26 and the crush relief 42 communicate with each other, the lubricating oil especially flows into a portion with a small capacity of the crush relief 42 and fills the portion, whereby pressure difference of the lubricating oil path 10a and the crush relief 42 becomes small, and the flow F3 by the pressure gradient hardly occurs, in addition to the aforementioned reason that the crush relief 42 is not deep enough to allow foreign matters to enter the crush relief 42.

Therefore, according to the present invention, the sizes of the inlet opening 26 and the separation inner circumferential surface 17S' need to be determined so that the oil groove 17g communicates with the axial direction oil groove 24A or 24B.

[Embodiment 2]

Figure 16:
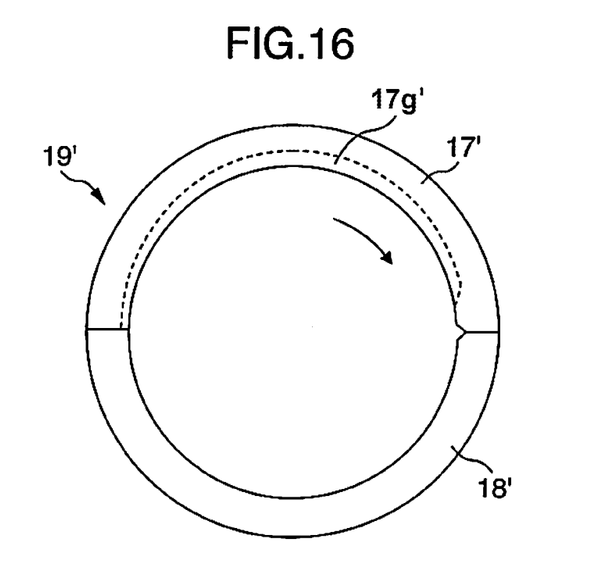
FIG. 16 is a front view of a crankshaft main bearing according to embodiment 2 of the present invention.

FIG. 16 shows a crankshaft main bearing 19' according to embodiment 2 of the present invention. As is understood from the drawing, an axial direction groove is formed only in a joint portion on the right side of the paper surface, among joint portions of semi-cylindrical bearings 17' and 18', and an oil groove 17g' which is formed at the semi-cylindrical bearing 17' on the upper side of the paper surface has the configuration of the present invention described above only on the front side in the rotational direction of the journal section. Namely, the oil groove 17g' has the depth gradually decreased toward the end portion on the front side in the rotational direction, thereby forms a separation inner circumferential surface on the front side in the rotational direction, while keeping a constant depth from a region including a central portion in the circumferential direction to an end portion on a rear side in the rotational direction, and thereby extends to the end surface in the circumferential direction of the semi-cylindrical bearing 17'.

[Embodiment 3]

Figure 17:
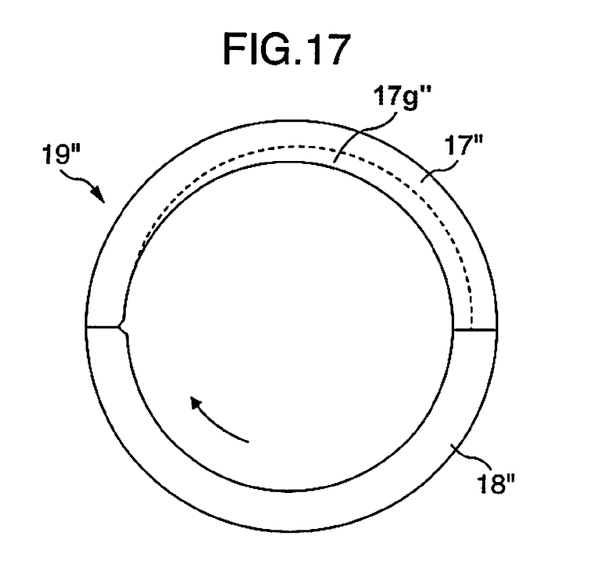
FIG. 17 is a front view of a crankshaft main bearing according to embodiment 3 of the present invention.

FIG. 17 shows a crankshaft main bearing 19" according to embodiment 3 of the present invention. As is understood from the drawing, an axial direction groove is formed only in a joint portion on the left side of the paper surface, among joint portions of semi-cylindrical bearings 17" and 18", and an oil groove 17g" which is formed at the semi-cylindrical bearing 17" on the upper side of the paper surface has the configuration of the present invention described above only on a rear side in the rotational direction of the journal section. Namely, the oil groove 17a" extends in the circumferential direction so that the depth is gradually decreased toward the end portion on the rear side in the rotational direction from an end surface on a front side in the rotational direction of the semi-cylindrical bearing 17″, and thereby forms a separation inner circumferential surface only on the rear side in the rotational direction.

The above described description is made for the embodiments, but it is obvious to a person skilled in the art that the present invention is not limited thereto, and various changes and modifications can be made within the range of the spirit and the accompanying claims of the present invention. For example, in each of the above described embodiments, the oil groove is formed in the semi-cylindrical bearing on the upper side, but may be formed only in the semi-cylindrical bearing on the lower side. Further, the oil groove may be formed so that the depth is maximum at the central portion in the circumferential direction of the semi-cylindrical bearing, and gradually decreases toward both the end portions in the circumferential direction of the semi-cylindrical bearing, and the sectional shape orthogonal to the longitudinal direction of the oil groove may be any shape such as a semicircular shape, and a triangular shape besides the rectangular shape.

The invention claimed is:

1. A crankshaft main bearing assembly comprising:
    a journal section of a crankshaft which is supported by a main bearing, the journal section including a lubricating oil path extending therein, and an inlet opening of the lubricating oil path that is formed on an outer circumferential surface thereof, wherein
    the main bearing is composed of a pair of semi-cylindrical bearings, and any one of the semi-cylindrical bearings has an oil groove formed on an inner circumferential surface thereof,
    the oil groove extends in a circumferential direction at least through a central portion of the one semi-cylindrical bearing in the circumferential direction and is arranged so that the center of the width of the oil groove in an axial direction aligns with the center of the inlet opening of the journal section, and an end portion of the oil groove in the circumferential direction does not extend to an end surface of the one semi-cylindrical bearing in the circumferential direction and therefore the inner circumferential surface extends between the end portion of the oil groove in the circumferential direction and the end surface of the one semi-cylindrical bearing in the circumferential direction to form a separation inner circumferential surface therebetween,
    the end surface of the one semi-cylindrical bearing to which the oil groove does not extend, and an end surface of the other semi-cylindrical bearing which is joined to the end surface of the one semi-cylindrical bearing each comprise an inclined surface on an inner circumferential surface side that extends throughout an entire length in the axial direction, so that an axial direction groove is formed at a joint portion of the pair of semi-cylindrical bearings, and the separation inner circumferential surface extends between the axial direction groove and the oil groove, and
    a length L1 of the separation inner circumferential surface is smaller than a length L2 of the inlet opening of the journal section, so that the oil groove is communicable with the axial direction groove via the inlet opening of the lubricating oil path.

2. The crankshaft main bearing assembly according to claim 1, wherein the length L1 of the separation inner circumferential surface, and the length L2 of the inlet opening of the journal section satisfy the following relational expression of:

$$L2-L1 \geq 0.5 \text{ mm}.$$

3. The crankshaft main bearing assembly according to claim 2, wherein the length L1 of the separation inner circumferential surface, and the length L2 of the inlet opening of the journal section satisfy the following relational expression of:

$$L1 \geq L2 \times 0.3.$$

4. The crankshaft main bearing assembly according to claim 3, wherein the length L1 of the separation inner circumferential surface, and the length L2 of the inlet opening of the journal section satisfy the following relational expression of:

$$L1 \geq L2 \times 0.6.$$

5. The crankshaft main bearing assembly according to claim 1, wherein the depth of the axial direction groove from the inner circumferential surface of the main bearing is 0.1 mm to 1 mm.

6. The crankshaft main bearing assembly according to claim 5, wherein the depth of the axial direction groove from the inner circumferential surface of the main bearing is 0.1 mm to 0.5 mm.

7. The crankshaft main bearing assembly according to claim 1, wherein the width of the axial direction oil groove in the circumferential direction on the inner circumferential surface of the main bearing is 0.2 mm to 2 mm.

8. The crankshaft main bearing assembly according to claim 1, wherein both end portions of the oil groove in the circumferential direction do not extend to the respective end surfaces of the one semi-cylindrical bearing in the circumferential direction, so that the separation inner circumferential surfaces are provided on both sides of the oil groove in the circumferential direction.

9. The crankshaft main bearing assembly according to claim 1, wherein a crush relief is formed on the inner circumferential surface side of the pair of semi-cylindrical bearings, adjacent to each of the end surfaces of the semi-cylindrical bearings in the circumferential direction.

10. The crankshaft main bearing assembly according to claim 9, wherein an end portion of the crush relief formed on a side of the one semi-cylindrical bearing in the circumferential direction is located on an end surface side with respect to the end portion of the oil groove in the circumferential direction.

11. The crankshaft main bearing assembly according to claim 1, wherein an area of the inlet opening on an outer circumferential surface of the journal section is larger than a sectional area of the lubricating oil path in the journal section, and therefore, a channel transition portion, a sectional area of which gradually changes, is formed between the inlet opening and the lubricating oil path.

12. The crankshaft main bearing assembly according to claim 11, wherein a depth dimension of the channel transition portion from the outer circumferential surface of the journal section is 1 mm to 2 mm.

* * * * *